(12) United States Patent
Mattsson et al.

(10) Patent No.: US 12,545,102 B2
(45) Date of Patent: *Feb. 10, 2026

(54) TRANSMISSION ARRANGEMENT

(71) Applicant: VOLVO CONSTRUCTION EQUIPMENT AB, Eskilstuna (SE)

(72) Inventors: Per Mattsson, Sölvesborg (SE); Peter Johansson, Växjö (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 171 days.

This patent is subject to a terminal disclaimer.

(21) Appl. No.: 18/368,858

(22) Filed: Sep. 15, 2023

(65) Prior Publication Data
US 2024/0100942 A1    Mar. 28, 2024

(30) Foreign Application Priority Data
Sep. 23, 2022 (EP) ..................................... 22197501

(51) Int. Cl.
    *B60K 17/36*      (2006.01)
    *B60K 1/02*      (2006.01)
    (Continued)

(52) U.S. Cl.
CPC ............... *B60K 17/36* (2013.01); *B60K 1/02* (2013.01); *F16H 37/082* (2013.01);
(Continued)

(58) Field of Classification Search
CPC ....... F16H 2200/201; F16H 2200/2012; F16H 2200/2038; F16H 2200/2041; B60K 17/34–3467; B60K 17/36
See application file for complete search history.

(56) References Cited

U.S. PATENT DOCUMENTS 3,793,909 A * 2/1974 Herman ............... F16H 3/66
                                              475/59
3,956,946 A * 5/1976 Murakami ............ F16H 3/66
                                            475/276

(Continued)

FOREIGN PATENT DOCUMENTS

| EP | 3649374 B1 | 3/2021 |
| EP | 4074532 A1 | 10/2022 |
| EP | 4075021 A1 | 10/2022 |

OTHER PUBLICATIONS

Extended European Search Report, European Application No. 22197501.4, mailed Mar. 16, 2023, 14 pages.

*Primary Examiner* — James J Taylor, II
(74) *Attorney, Agent, or Firm* — Sage Patent Group (57) ABSTRACT

A transmission arrangement including a first planetary gear set comprising a first sun gear, a first ring gear and a first planet carrier; a second planetary gear set comprising a second sun gear, a second ring gear and a second planet carrier; a third planetary gear set comprising a third sun gear, a third ring gear and a third planet carrier; an input shaft being operatively connected to the second and third sun gears; a first intermediate shaft operatively connected to the first ring gear and to the second planet carrier; a gear selection arrangement; a first output shaft to be connected to a first driven axle, a second output shaft to be connected to a second driven axle, and a differential unit configured to distribute torque to the first and second output shafts.

14 Claims, 6 Drawing Sheets

(51) Int. Cl.
*B60K 17/346* (2006.01)
*F16H 37/04* (2006.01)
*F16H 37/08* (2006.01)

(52) U.S. Cl.
CPC ...... *B60K 17/346* (2013.01); *F16H 2037/047* (2013.01); *F16H 2200/0039* (2013.01); *F16H 2200/201* (2013.01); *F16H 2200/2038* (2013.01); *F16H 2200/2041* (2013.01)

(56) References Cited

U.S. PATENT DOCUMENTS

| | | | |
|---|---|---|---|
| 6,705,966 B2 * | 3/2004 | Schroder | B60K 17/3462 475/233 |
| 6,705,967 B2 * | 3/2004 | Raghavan | F16H 3/666 475/275 |
| 7,399,250 B2 * | 7/2008 | Gansloser | B60K 17/3462 180/250 |
| 8,540,067 B2 * | 9/2013 | Kingston | B60K 17/346 475/231 |
| 9,435,405 B2 * | 9/2016 | Etchason | F16H 3/62 |
| 10,054,198 B2 * | 8/2018 | Etchason | F16H 3/66 |
| 11,566,398 B2 * | 1/2023 | Mattsson | F16H 3/64 |
| 2003/0111285 A1 * | 6/2003 | Gansloser | B60K 17/22 180/233 |

* cited by examiner

TRANSMISSION ARRANGEMENT

CROSS REFERENCE TO RELATED APPLICATIONS

This application claims priority to European Patent Application No. 22197501.4, filed on Sep. 23, 2022, the disclosure and content of which is incorporated by reference herein in its entirety.

TECHNICAL FIELD

The disclosure relates generally to a transmission arrangement for a vehicle. In particular aspects, the disclosure relates to a transmission arrangement, a tractor, and an articulated hauler. The disclosure can be applied in heavy-duty vehicles and working machines, such as trucks, buses, and construction equipment. In particular, the transmission arrangement can be applied in electrically operated vehicles. Although the disclosure is described with respect to an articulated hauler, the disclosure is not restricted to this particular vehicle.

BACKGROUND

In connection with transportation of heavy loads at construction sites or the like, a working machine is often used. The working machines may be utilized for transportations in connection with road or tunnel building, sand pits, mines, forestry, and similar environments, and are often provided in the form of an articulated hauler or a rigid hauler.

Recently, not only cars are using electric machines as prime mover(s) for propulsion, also working machines are striving to use such more environmentally friendly prime movers. However, within the rough terrain at which the working machine is frequently operated, it is required that the vehicle is able to operate in a desired manner, and high quality of the vehicle gearbox is necessary.

Conventionally, the gearbox is arranged for adjusting the speed and strength of the vehicle in dependency of the specific driving scenario. The gearbox comprises a transmission arrangement and depending on the specific type of gearbox, the transmission arrangement may comprise e.g., gearwheels in meshed connection with each other, or planetary gear sets comprising a respective sun gear, ring gear and a planet carrier, or a combination of gearwheels in meshed connection and one or more planetary gear sets.

Due to the difference in speed range of an electric machine compared to a conventional internal combustion engine, the operational demands for a gearbox of an electrically propelled vehicle differs from an internal combustion engine, ICE, propelled vehicle. Furthermore, an electrical powertrain generally requires more space in view of batteries, power electronics, and possible fuel cells with accompanying hydrogen tanks than a conventional powertrain. For articulated haulers comprising a tractor with a single wheel pair, electric machines, batteries, power electronics, hydraulic pumps, etc., typically have to be positioned at a front of the tractor, in front of the wheel pair. This adds significant weight at a foremost and relatively high position, which changes the centre of gravity in comparison with a tractor run by a combustion engine. The changed centre of gravity risks to render the tractor instable and lead to an unwanted driving behaviour.

There is thus a desire to further improve the gearbox for a working machine such as an articulated hauler.

SUMMARY

It is an object of the present disclosure to provide a transmission arrangement that in at least some aspect improves the operational performance for a working machine propelled with one or more electric machines. In particular, it is an object to provide a transmission arrangement suitable for use in an articulated hauler.

According to a first aspect of the disclosure, a transmission arrangement according to claim 1 is provided. The transmission arrangement comprises a first planetary gear set comprising a first sun gear, a first ring gear and a first planet carrier carrying a first set of planet gears, the first set of planet gears being in meshing engagement with the first ring gear and the first sun gear, a second planetary gear set comprising a second sun gear, a second ring gear and a second planet carrier carrying a second set of planet gears, the second set of planet gears being in meshing engagement with the second ring gear and the second sun gear, a third planetary gear set comprising a third sun gear, a third ring gear and a third planet carrier carrying a third set of planet gears, the third set of planet gears being in meshing engagement with the third ring gear and the third sun gear, an input shaft connectable to a prime mover, the input shaft being operatively connected to the second sun gear and to the third sun gear, a first intermediate shaft operatively connected to the first ring gear and to the second planet carrier, and a gear selection arrangement, comprising
  a first locking mechanism connected to the first planet carrier,
  a second locking mechanism connected to the first sun gear, the second ring gear and the third planet carrier, and
  a third locking mechanism connected to the third ring gear, a first output shaft configured to be connected to a first driven axle, a second output shaft configured to be connected to a second driven axle, and a differential unit connected to the first intermediate shaft, the differential unit being configured to distribute torque to the first and second output shafts.

The wording "operatively connected to" should in the following and throughout the entire description be interpreted such that the components thereof are fixedly connected to each other, i.e., the rotational speed of the components which are operatively connected to each other is the same. Hence, no connecting mechanism or the like is arranged between the components that are operatively connected to each other and they can therefore not be disengaged from one another. In a similar vein, the wording "connected to" should be construed as components being either operatively connected to each other, or mechanically connected to each other via a transmission component, such as a gearwheel, or a clutch, etc.

By means of the above-described transmission arrangement, a three-stage transmission is provided which is particularly advantageous for use in combination with a prime mover in the form of an electric machine, such as an electric motor or a combined electric motor and generator. Thus, and according to an example embodiment, the prime mover may be an electric machine. The transmission arrangement provides for three gears using only locking mechanisms for obtaining the three different gear stages. Advantageously, each one of the first, second and third locking mechanisms may be arranged as friction brakes. According to an example embodiment, each of the first, second and third locking mechanisms may, e.g., be arranged as a wet lamella brake. Hereby, a rapid and smooth changing between the gear stages is achieved while driving. In particular, gear shifting can, by the transmission arrangement, be carried out with retained power transfer.

Furthermore, the present disclosure enables for a transmission arrangement with relatively large gear ratio steps. Also, the three-stage transmission enables for a reduction of the rotational speed between the input shaft and the first and second output shafts for each one of the three gear stages. These features are particularly advantageous for use in connection to a prime mover in the form of an electric machine.

The provision of a differential unit configured to distribute torque to the first and second output shafts makes the transmission arrangement particularly suitable for working machines having more than one driven axle, such as articulated haulers having the first driven axle provided on a tractor of the articulated hauler and the second driven axle provided on a trailer of the articulated hauler. Any one or both of the first and second output shafts may be configured to drive more than one driven axle, such as two driven axles. The transmission arrangement disclosed herein is further beneficial for use in an electric powertrain of an articulated hauler due to a relatively low weight and volume in comparison with prior art transmission arrangements intended for use with an ICE. Hence, space is provided for batteries and power electronics of the electric powertrain. The electric powertrain may of course comprise further differential units for distributing torque between driven axles, shafts of a driven axle, and/or wheels of the working machine.

The transmission arrangement comprising the differential unit and the first and second output shafts may also be suitable for use in other vehicles having more than one driven axle, such as wheel loaders, off-road trucks and other all-wheel-drive vehicles. As used herein, a driven axle may refer to a single driven axle or an axle assembly comprising two or more driven axles connected to each other either rigidly or by a disconnecting unit, such as a dog clutch or a friction clutch, or by a gear unit, such as a differential unit.

Optionally, as seen in a longitudinal plane of the transmission arrangement, the first output shaft extends at an angle with respect to the second output shaft. The angle may be within a range of 5-20°, preferably 10-15°. This makes the transmission arrangement particularly suitable for an electrically operated articulated hauler in which a first driven axle is provided in front of the transmission arrangement, and the second driven axle is provided behind the transmission arrangement as seen in a travel direction of the hauler. Sufficient ground clearance can hereby be provided below a hauler hitch of the articulated hauler. The longitudinal plane of the transmission is defined such that longitudinal axes of the first and second output shafts are within the longitudinal plane. As a special case, longitudinal axes of the input shaft and the first intermediate shaft are also within said longitudinal plane.

Optionally, the differential unit comprises a fourth planetary gear set comprising first, second and third planetary members, wherein the first intermediate shaft is connected to the second planetary member, such as a fourth ring gear, the first output shaft is connected to the first planetary member, such as a fourth sun gear, and the second output shaft is connected to the third planetary member, such as a fourth planet carrier. As mentioned, the first output shaft may herein be configured to drive a driven axle of a tractor, and the second output shaft may be configured to drive a driven axle of a trailer.

Optionally, the transmission arrangement further comprises a beveloid gear unit connected between the first output shaft and the first planetary member of the fourth planetary gear set. The beveloid gear unit, which may also be referred to as a conical involute gear unit, is able provide the relatively small angle within the range of 5-20° between the first and second output shafts. The beveloid gear unit may comprise a first gearwheel operatively connected to the first planetary member and a second gearwheel operatively connected to the first output shaft, the first and second gearwheels being in meshing engagement.

Optionally, the fourth planetary gear set comprises a fourth set of planet gears in the form of double planet gears. The double planet gears may be gearwheels provided on parallel axes of rotation and being in meshing engagement with one another. By using double planet gears, the torques on the fourth sun gear and the fourth planet carrier will have the same direction. Hence, the fourth sun gear may provide power to the first output shaft and the fourth planet carrier may provide power to the second output shaft, as indicated above. In an articulated hauler application, a desired larger amount of torque may hereby be delivered to the second driven axle on the trailer than to the first driven axle on the tractor. This is in contrast to other solutions that may deliver a too large amount of torque to the second driven axle.

Optionally, and as indicated above, the first planetary member of the fourth planetary gear set is a fourth sun gear, the second planetary member of the fourth planetary gear set is a fourth ring gear, and the third planetary member of the fourth planetary gear set is a fourth planet carrier carrying the fourth set of planet gears.

Optionally, the fourth set of planet gears comprises a plurality of planet gear pairs, each planet gear pair comprising an outer planet gear being in meshing engagement with the fourth ring gear and an inner planet gear being in meshing engagement with the fourth sun gear and the outer planet gear. A common planet carrier may carry both planet gears of the planet gear pairs.

Optionally, the transmission arrangement further comprises a second clutch configured to selectively rotationally connect two of the first, second and third planetary members of the fourth planetary gear set. Hence, by means of the second clutch, the planetary members of the fourth planetary gear set may be locked together for common rotation. This is referred to as longitudinal differential locking. The clutch may advantageously be a friction clutch, which enhances machine performance at rough terrain conditions, where frequent use of a longitudinal differential lock may occur. For example, the clutch may be a wet lamella clutch, which to some extent permits continuous slipping in the clutch. The second clutch may alternatively be a dog clutch.

Optionally, the gear selection arrangement is adapted to assume three gear stages, wherein a first gear stage is obtainable by solely locking the first locking mechanism, a second gear stage is obtainable by solely locking the second locking mechanism, and a third gear stage is obtainable by solely locking the third locking mechanism. Hereby, only one locking mechanism is actuated for each gear stage. An advantage is that wear of the locking mechanisms can be reduced as the locking mechanisms will not need to be actuated for each gear. Also, the engagement of only one locking mechanism for each gear stage implies that change between two different gear stages can be achieved in a fast and smooth manner whilst still requiring few components.

Optionally, the transmission arrangement further comprises a first clutch configured to selectively rotationally connect the input shaft to the first intermediate shaft. An additional gear stage is hereby achieved in addition to the three gear stages obtainable using the locking mechanisms of the gear selection arrangement, with the first clutch engaged and the first, second and third locking mechanisms disengaged. The first clutch may be a friction clutch, such as a wet lamella clutch, although a dog clutch is also possible to use.

Optionally, the transmission arrangement further comprises a cylindrical gear unit via which the differential unit is connected to the first intermediate shaft. The cylindrical gear unit makes it possible to position the prime mover(s) above the first driven axle and with a clearance thereto. The cylindrical gear unit may be a spur gear unit or a helical gear unit.

Optionally, the transmission arrangement further comprises an input shaft gearwheel arranged on the input shaft, the input shaft gearwheel being arranged in meshing engagement with a first gearwheel and a second gearwheel, wherein the first gearwheel is connectable to a first prime mover, and the second gearwheel is connectable to a second prime mover. An advantage is that the transmission arrangement can hereby be mechanically connected to two individually controlled prime movers via the first gearwheel and the second gearwheel, respectively. The input shaft gearwheel is thus arranged as a reduction gear. By using two prime movers, the power requirements for each individually controlled prime mover can hereby be reduced. Thus, in the case of using electric machines as prime movers, two smaller electric machines, in terms of electric power requirement, can be chosen instead of one larger electric machine requiring larger power for propulsion. Alternatively, two relatively large electric machines can be used, providing an increased motive power for the working machine.

Optionally, a stationary gear ratio for each of the first, second and third planetary gear sets may be negative. In other words, all three of the first, second and third planetary gear sets have single planet gears.

According to a second aspect of the disclosure, a tractor comprising the transmission arrangement according to the first aspect is provided. The tractor further comprises the prime mover connectable or connected to the input shaft and the first driven axle connectable or connected to the first output shaft. The prime mover may
be an electric machine, such as a combined electric motor and generator. Advantages and advantageous features of the second aspect largely correspond to those of the first aspect.

According to a third aspect of the disclosure, an articulated hauler comprising the tractor according to the second aspect is provided. The articulated hauler further comprises a trailer comprising the second driven axle connectable or connected to the second output shaft. Advantages and advantageous features of the third aspect largely correspond to those of the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

With reference to the appended drawings, below follows a more detailed description of aspects of the disclosure cited as examples.

The drawings are schematic and not drawn to scale. Like reference character refer to like elements throughout the description.

DETAILED DESCRIPTION

Aspects set forth below represent the necessary information to enable those skilled in the art to practice the disclosure.

Figure 1:
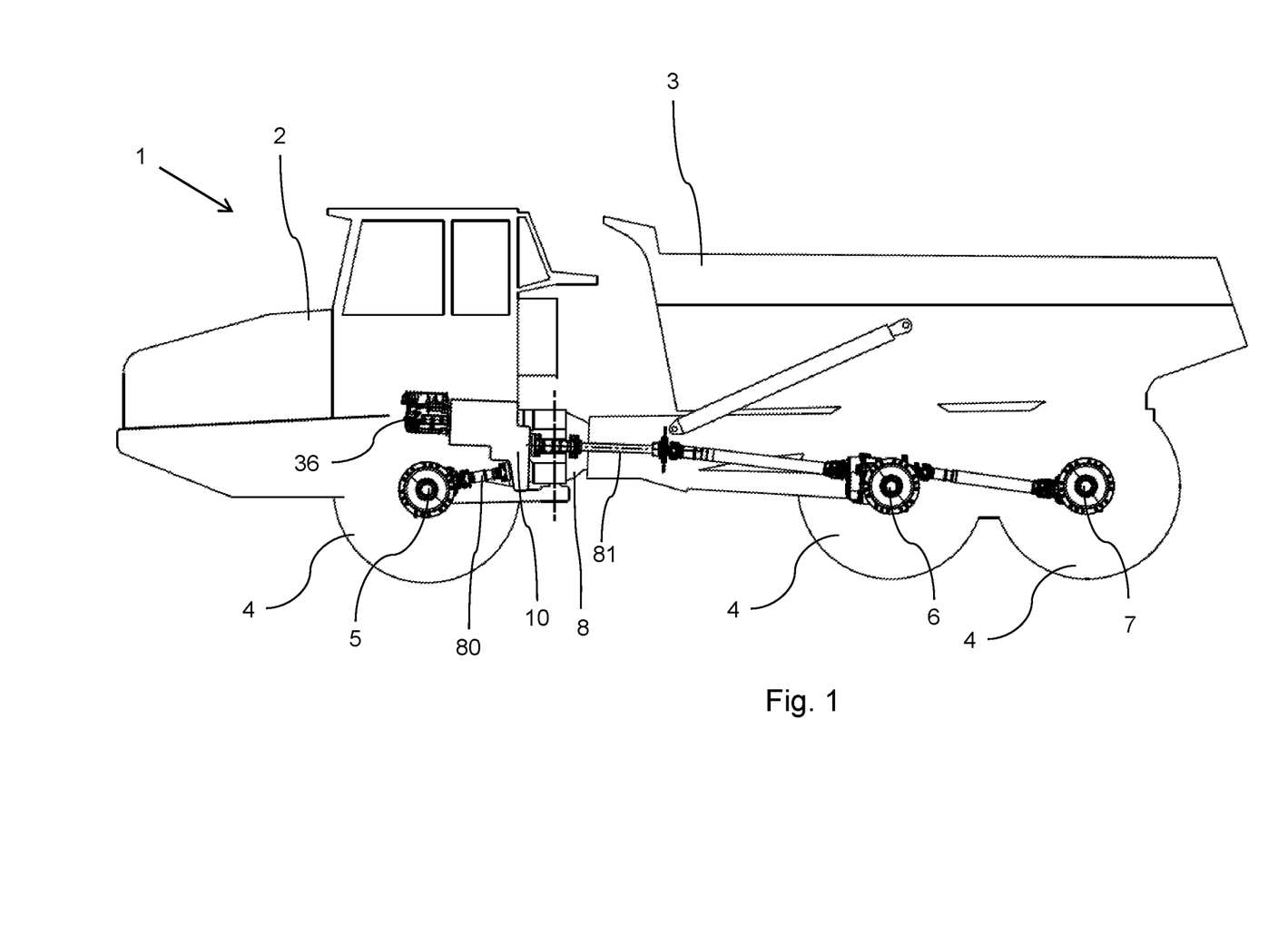
FIG. 1 is a schematic view of an exemplary vehicle according to one example.

FIG. 1 depicts a working machine in the form of an articulated hauler 1 according to an example embodiment. The articulated hauler 1 comprises a tractor 2 having a first driven axle 5, and a trailer 3 having a second driven axle 6 and a third driven axle 7. This is thus an example of an axle assembly, as described above, here comprising the second and third driven axles 6, 7. The third driven axle 7 may be disconnectable. Ground engaging members 4 in the form of wheel pairs are mounted on the axles 5, 6, 7. In alternative configurations, the trailer may be provided with a single driven axle, and/or the ground engaging members may be crawlers.

The tractor 2 further comprises a prime mover in the form of an electric machine, in the following referred to as an electric motor 36, installed above the first driven axle 5 and connected to two drive shafts (not shown) thereof via a transmission arrangement 10. The tractor 2 may comprise more than one electric motor 36, such as two or more electric motors. Via the transmission arrangement 10, the electric motor 36 is also connected to two drive shafts (not shown) of the second driven axle 6 of the trailer 3. In some embodiments, the electric motor 36 is also selectively connectable to two drive shafts (not shown) of the third driven axle 7. The electric motor 36 is thereby part of a powertrain configured to provide propulsion power for driving the articulated hauler 1.

Working hydraulics (not shown) of the articulated hauler may be driven by a separate electric motor (not shown), such that the working hydraulics are decoupled from the propulsion of the articulated hauler 1 and may be optimized separately. A separate working hydraulics unit comprising an electric motor and one or more hydraulic pumps may thus be provided separately from the powertrain of the articulated hauler 1.

Figure 2:
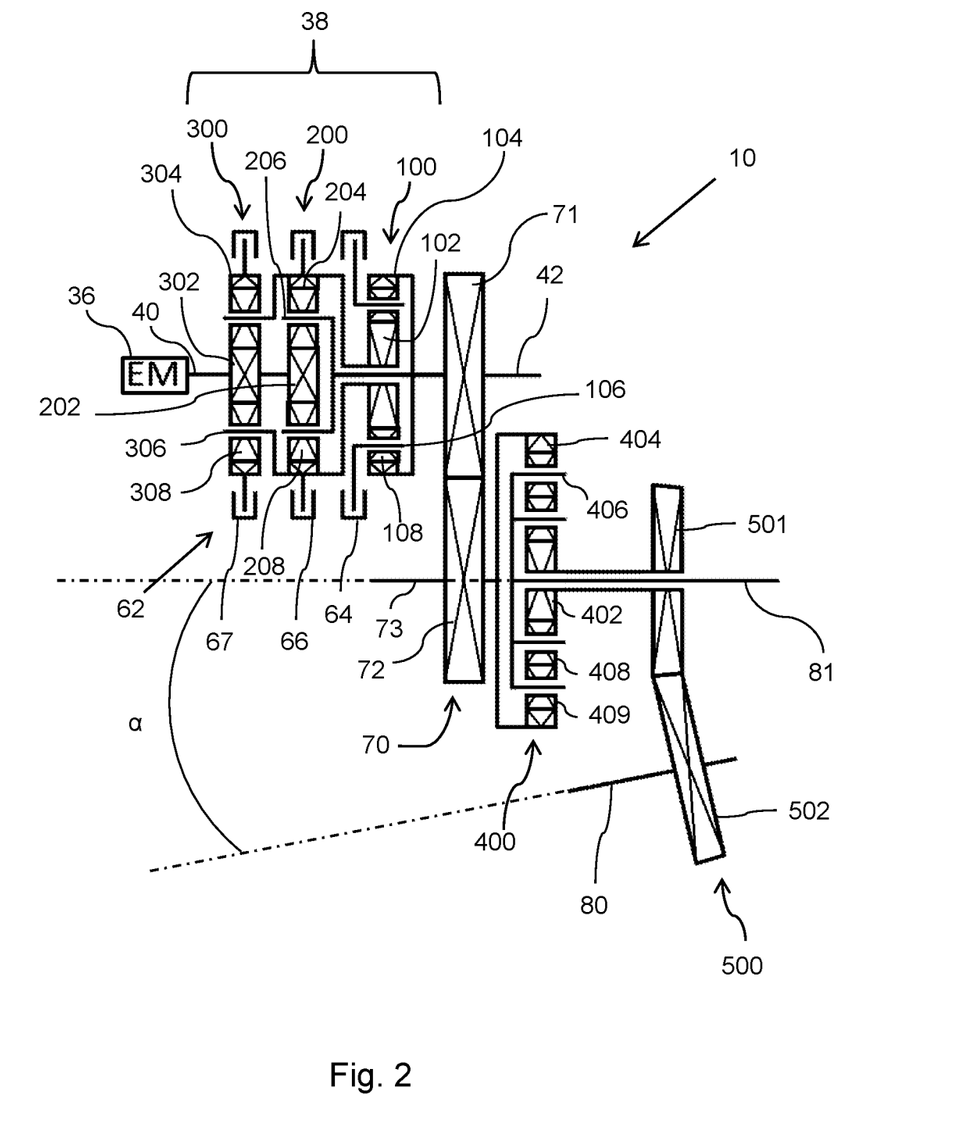
FIG. 2 is a schematic view of a transmission arrangement according to a first embodiment.

FIG. 2 depicts a transmission arrangement 10 according to a first example embodiment. The transmission arrangement 10 may be used in the powertrain of the articulated hauler 1 illustrated in FIG. 1. The transmission arrangement 10 comprises an input shaft 40 to which the electric motor 36 is connected, a first output shaft 80 configured to be connected to a first driven axle 5, such as the first driven axle 5 of the tractor 2 depicted in FIG. 1, and a second output shaft 81 configured to be connected to a second driven axle 6, such as the second driven axle 6 of the trailer 3. Purely by way of example, and as indicated in FIG. 2, an output shaft of the electric motor 36 may be rotationally fixedly connected to an input shaft 40 of the transmission arrangement 10. The output shafts 80, 81 may be connected to the driven axles 5, 6 via one or more gear sets (not shown).

As can be seen in FIG. 2, the transmission arrangement 10 comprises a primary gear arrangement 38 comprising a first planetary gear set 100, a second planetary gear set 200 and a third planetary gear set 300. The first planetary gear set 100 comprises a first sun gear 102, a first ring gear 104 and a first planet carrier 106 carrying a first set of planet gears 108. The first set of planet gears 108 are in meshing engagement with the first ring gear 104 and the first sun gear 102. The second planetary gear set 200 comprises a second sun gear 202, a second ring gear 204 and a second planet carrier 206 carrying a second set of planet gears 208. The second set of planet gears 208 are in meshing engagement with the second ring gear 204 and the second sun gear 202. The third planetary gear set 300 comprises a third sun gear 302, a third ring gear 304 and a third planet carrier 306 carrying a third set of planet gears 308. The third set of planet gears 308 are in meshing engagement with the third ring gear 304 and the third sun gear 302.

The transmission arrangement 10 further comprises the above-described input shaft 40 and a first intermediate shaft 42. The input shaft 40 is operatively connected to the second sun gear 202 and to the third sun gear 302, and connectable to the electric motor 36. The input shaft 40 can be directly connected to the electric motor 36 or connected to the electric motor 36 via a transmission component, such as a clutch or via a gear set. The first intermediate shaft 42 is operatively connected to the first ring gear 104 and to the second planet carrier 206.

Furthermore, and according to the primary gear arrangement 38 exemplified in FIG. 2, the first sun gear 102 is operatively connected to the second ring gear 204 and to the third planet carrier 306. The second sun gear 202 is operatively connected to the third sun gear 302.

The transmission arrangement 10 further comprises a gear selection arrangement 62 for controlling the primary gear arrangement 38 to assume various gear conditions or gear stages. In particular, the primary gear arrangement 38 depicted and described in the following is configured to assume three different gear stages, i.e., three different gear ratios. The gear selection arrangement 62 comprises a first locking mechanism 64, a second locking mechanism 66, and a third locking mechanism 67. According to the example embodiment of FIG. 2, the first locking mechanism 64 is connected to the first planet carrier 106. The second locking mechanism 66 is connected to the first sun gear 102, the second ring gear 204 and to the third planet carrier 306. The third locking mechanism 67 is connected to the third ring gear 304. The first, second and third locking mechanisms 64, 66, 67 are herein configured as friction brakes.

A first gear stage of the primary gear arrangement 38 is obtainable by solely locking the first locking mechanism 64, a second gear stage is obtainable by solely locking the second locking mechanism 66, and a third gear stage is obtainable by solely locking the third locking mechanism 67.

The transmission arrangement 10 further comprises a differential unit 400 connected to the first intermediate shaft 42, herein via a cylindrical gear unit 70 comprising a first intermediate shaft gearwheel 71 rotationally fixed on the first intermediate shaft 42 and a second intermediate shaft gearwheel 72 rotationally fixed on a second intermediate shaft 73. Hence, the differential unit 400 is radially offset from the intermediate shaft 42. The differential unit 400 is configured to distribute torque to the first and second output shafts 80, 81 at a fixed ratio.

In the illustrated embodiment, the differential unit 400 comprises a fourth planetary gear set comprising first, second and third planetary members 402, 404, 406 in the form of a fourth sun gear 402, a fourth ring gear 404, and a fourth planet carrier 406. The first intermediate shaft 42 is connected to the fourth ring gear 404 via the cylindrical gear unit 70. The second output shaft 81 is operatively connected to the fourth planet carrier 406. The first output shaft 80 is connected to the fourth sun gear 402 via a beveloid gear unit 500 comprising a first gearwheel 501 rotationally fixed to the fourth sun gear 402 and a second gearwheel 502 rotationally fixed to the first output shaft 80, the second gearwheel 502 being in meshing engagement with the first gearwheel 501.

Due to the beveloid gear unit 500, the first output shaft 80 extends at an angle $\alpha$ with respect to the second output shaft 81, as seen in a longitudinal plane of the transmission arrangement 10. The angle $\alpha$ is within a range of 5-20°, such as 10-15°. Hence, a maximum ground clearance can be provided below a hitch 8 of the articulated hauler 1 (see FIG. 1).

The fourth planet carrier 406 carries a fourth set of planet gears in the form of double planet gears 408, 409. Hence, the fourth set of planet gears comprises a plurality of planet gear pairs interspaced between the fourth sun gear 402 and the fourth ring gear 404. Each planet gear pair comprises an outer planet gear 409 being in meshing engagement with the fourth ring gear 404 and an inner planet gear 408 being in meshing engagement with the fourth sun gear 402 and the outer planet gear 409.

The configuration of the fourth planetary gear set with double planet gears 408, 409 allows a desired distribution of torque to the tractor 2 and the trailer 3. More specifically, it allows, for example, 40-45% of torque to the first driven axle 5 of the tractor 2 and 55-60% of torque to the second and third driven axles 6, 7 of the trailer 3.

Figure 3:
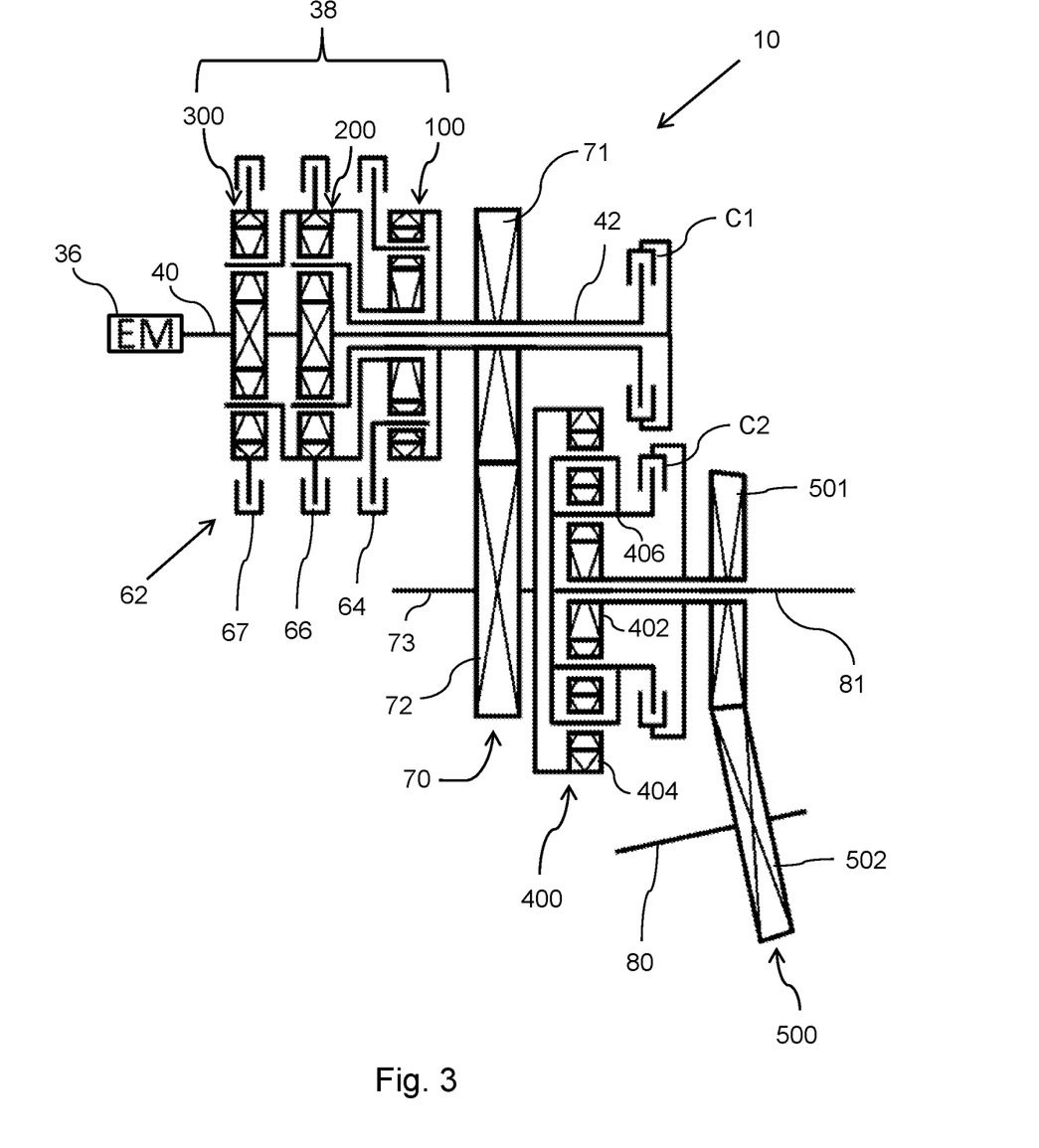
FIG. 3 is a schematic view of a transmission arrangement according to a second embodiment.

FIG. 3 depicts a transmission arrangement 10 according to a second example embodiment. The transmission arrangement 10 according to the second example embodiment differs from the first example embodiment only in that a first clutch C1 and a second clutch C2 are provided.

The first clutch C1 is configured to selectively rotationally connect the input shaft 40 to the first intermediate shaft 42, thereby providing a fourth gear ratio for torque transfer in addition to the three gear ratios described with reference to FIG. 2. The fourth gear ratio is achieved by engaging the first clutch C1 and disengaging the first, second and third locking mechanisms 64, 66, 67. The first clutch C1 is a friction clutch, such as a wet lamella clutch, although a dog clutch is also possible to use.

The second clutch C2 is configured to selectively rotationally connect any two of the first, second and third planetary members 402, 404, 406 of the fourth planetary gear set of the differential unit 400. In the illustrated second example embodiment, the second clutch C2 is configured to rotationally connect the fourth planet carrier 406 to the fourth sun gear 402. Similar to the first clutch C1, the second clutch C2 is a friction clutch, such as a wet lamella clutch, although it may alternatively be a dog clutch.

Figure 4:
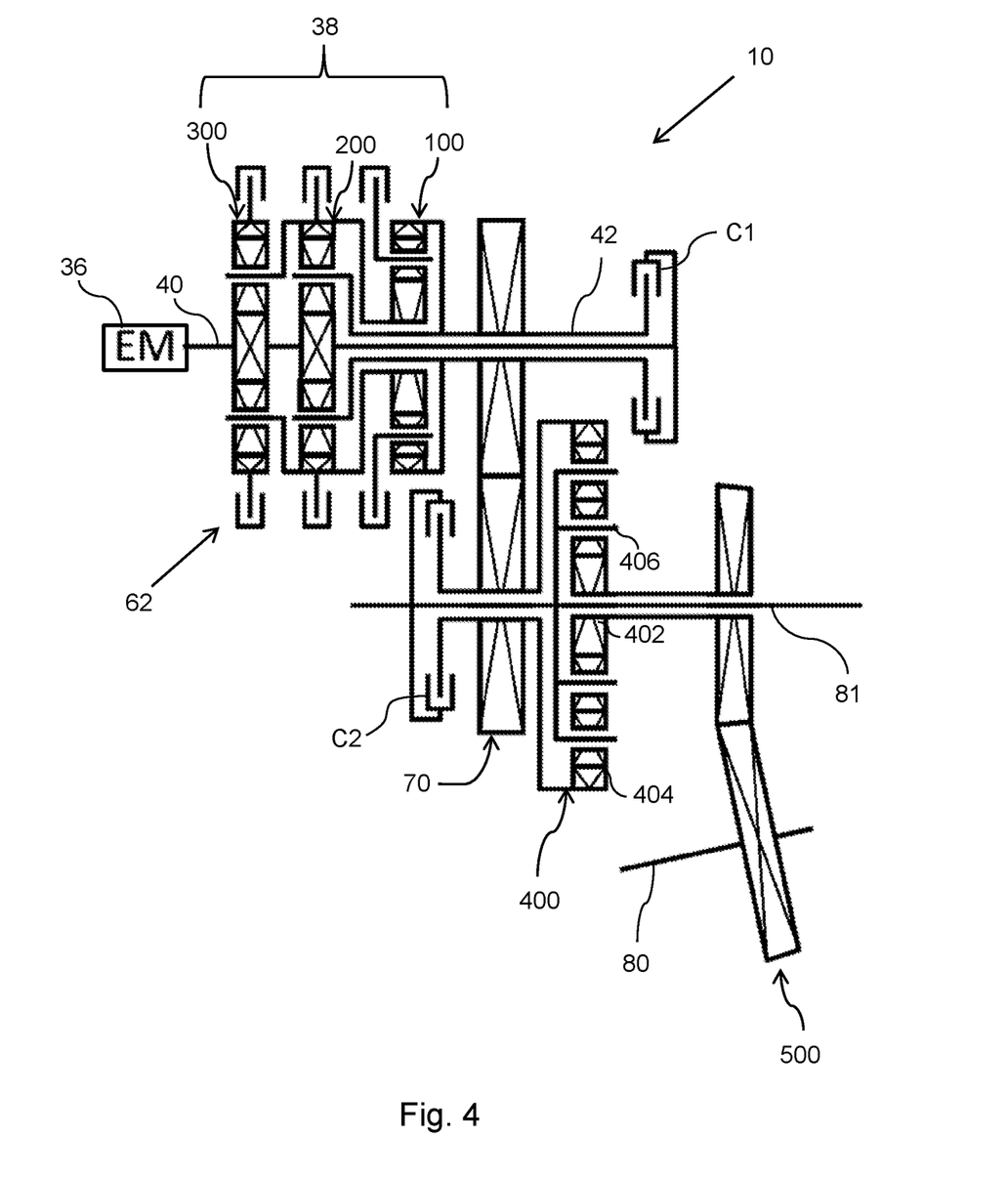
FIG. 4 is a schematic view of a transmission arrangement according to a third 30 embodiment.

FIG. 4 illustrates a transmission arrangement 10 according to a third example embodiment. The transmission arrangement 10 according to the third example embodiment differs from the second example embodiment only in that the second clutch C2 is configured to connect the fourth ring gear 404 to the fourth planet carrier 406. In an alternative non-illustrated embodiment, the second clutch C2 may instead be configured to selectively rotationally connect the fourth ring gear 404 to the fourth sun gear 402.

Figure 5:
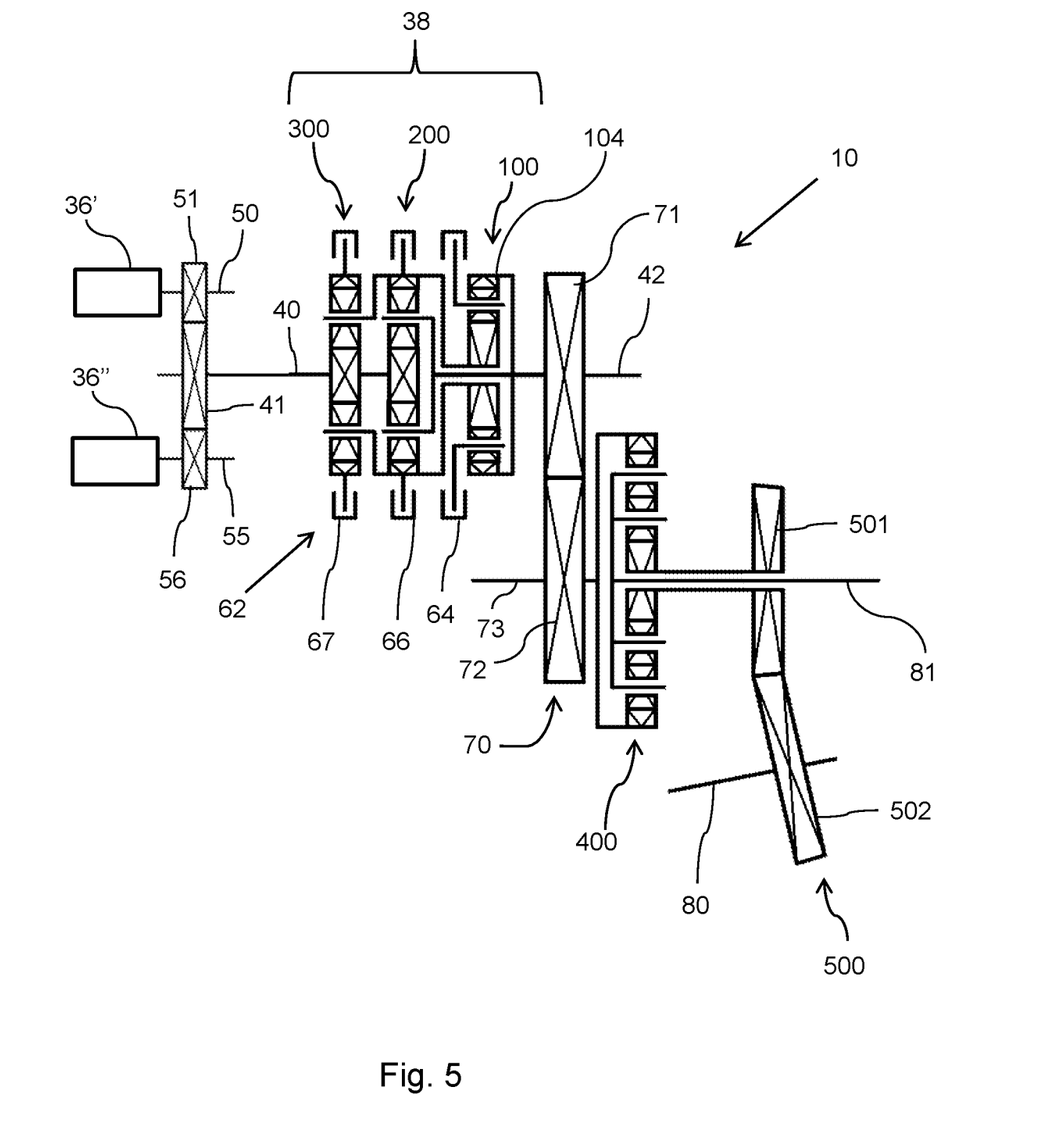
FIG. 5 is a schematic view of a transmission arrangement according to a fourth embodiment.

FIG. 5 illustrates a transmission arrangement 10 according to a fourth example embodiment. The transmission arrangement 10 according to the fourth example embodiment differs from the first example embodiment only in that two prime movers in the form of electric motors 36', 36" are provided, i.e., a first electric motor 36' and a second electric motor 36". An input shaft gearwheel 41 is arranged on the input shaft 40. The input shaft gearwheel 41 is arranged in meshing engagement with a first gearwheel 51 rotationally fixed on a first shaft 50, and with a second gearwheel 56 rotationally fixed on a second shaft 55. The first gearwheel 51 is connected to or connectable to the first electric motor 36' via the first shaft 50. The second gearwheel 56 is connected to or connectable to the second electric motor 36" via the second shaft 55. Clutches (not shown) or similar may be provided for selectively disconnecting one or both electric motors 36', 36" from the input shaft gearwheel 41.

Figure 6:
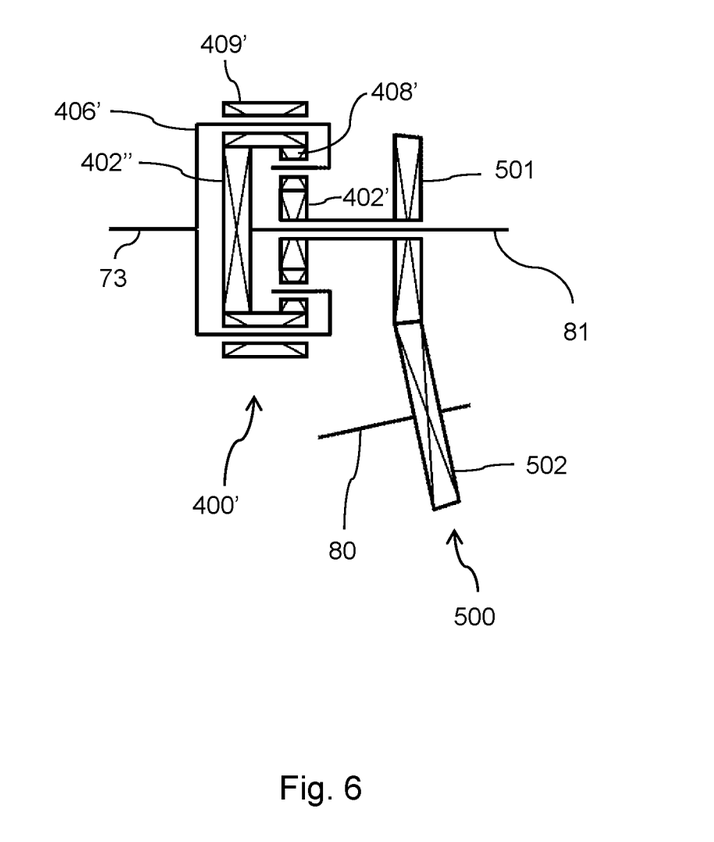
FIG. 6 is a schematic view of parts of a transmission arrangement according to an alternative embodiment.

FIG. 6 illustrates an alternative configuration of a differential unit 400', that may be used in any one of the above-described exemplary embodiments. In this alternative configuration, the differential unit 400' comprises a fourth planetary gear set having a small diameter fourth sun gear 402' connected to the first output shaft 80 via the beveloid gear unit 500, and a large diameter fourth sun gear 402" operatively connected to the second output shaft 81. The small diameter and the large diameter fourth sun gears 402', 402" are coaxially arranged. The differential unit 400' further comprises a fourth planet carrier 406' operatively connected to the second intermediate shaft 73. The fourth planet carrier 406' carries an inner planet gear 408' and an outer planet gear 409' in meshing engagement with each other. The inner planet gear 408' is arranged in meshing engagement with the small diameter fourth sun gear 402'. The outer planet gear 409' is arranged in meshing engagement with the large diameter fourth sun gear 402". The differential unit 400' in the alternative configuration enables a torque distribution in which more torque is distributed to the second driven axle 6 and less to the first driven axle 5 in comparison with the torque distribution for the differential unit 400 shown in FIGS. 2-5.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A transmission arrangement, comprising:
  a first planetary gear set comprising a first sun gear, a first ring gear and a first planet carrier carrying a first set of planet gears, the first set of planet gears being in meshing engagement with the first ring gear and the first sun gear,
  a second planetary gear set comprising a second sun gear, a second ring gear and a second planet carrier carrying a second set of planet gears, the second set of planet gears being in meshing engagement with the second ring gear and the second sun gear,
  a third planetary gear set comprising a third sun gear, a third ring gear and a third planet carrier carrying a third set of planet gears, the third set of planet gears being in meshing engagement with the third ring gear and the third sun gear,
  an input shaft connectable to a prime mover, the input shaft being operatively connected to the second sun gear and to the third sun gear,
  a first intermediate shaft operatively connected to the first ring gear and to the second planet carrier,
  a gear selection arrangement, comprising
    a first locking mechanism connected to the first planet carrier,
    a second locking mechanism connected to the first sun gear, the second ring gear and the third planet carrier, and
    a third locking mechanism connected to the third ring gear,
  a first output shaft configured to be connected to a first driven axle,
  a second output shaft configured to be connected to a second driven axle, and a differential unit connected to the first intermediate shaft, the differential unit being configured to distribute torque to the first and second output shafts, wherein the gear selection arrangement is adapted to assume three gear stages, wherein a first gear stage is obtainable by solely locking the first locking mechanism, a second gear stage is obtainable by solely locking the second locking mechanism, and a third gear stage is obtainable by solely locking the third locking mechanism.

2. The transmission arrangement according to claim 1, wherein, as seen in a longitudinal plane of the transmission arrangement, the first output shaft extends at an angle ($\alpha$) with respect to the second output shaft.

3. The transmission arrangement according to claim 2, wherein the angle ($\alpha$) is within a range of 5-20°.

4. The transmission arrangement according to claim 1, wherein the differential unit comprises a fourth planetary gear set comprising first, second and third planetary members, wherein the first intermediate shaft is connected to the second planetary member, the first output shaft is connected to the first planetary member, and the second output shaft is connected to the third planetary member.

5. The transmission arrangement according to claim 4, further comprising a beveloid gear unit connected between the first output shaft and the first planetary member of the fourth planetary gear set.

6. The transmission arrangement according to claim 4, wherein the fourth planetary gear set comprises a fourth set of planet gears in the form of double planet gears.

7. The transmission arrangement according to claim 6, wherein the first planetary member of the fourth planetary gear set is a fourth sun gear, the second planetary member of the fourth planetary gear set is a fourth ring gear, and the third planetary member of the fourth planetary gear set is a fourth planet carrier carrying the fourth set of planet gears.

8. The transmission arrangement according to claim 7, wherein the fourth set of planet gears comprises a plurality of planet gear pairs, each planet gear pair comprising an outer planet gear being in meshing engagement with the fourth ring gear and an inner planet gear being in meshing engagement with the fourth sun gear and the outer planet gear.

9. The transmission arrangement according to claim 4, further comprising a second clutch (C2) configured to selectively rotationally connect two of the first, second and third planetary members of the fourth planetary gear set.

10. The transmission arrangement according to claim 1, further comprising a cylindrical gear unit via which the differential unit is connected to the first intermediate shaft.

11. A tractor comprising the transmission arrangement according to claim 1, the prime mover connectable or connected to the input shaft, and the first driven axle connectable or connected to the first output shaft.

12. An articulated hauler comprising the tractor according to claim 11 and a trailer, the trailer comprising the second driven axle connectable or connected to the second output shaft.

13. A transmission arrangement, comprising:
a first planetary gear set comprising a first sun gear, a first ring gear and a first planet carrier carrying a first set of planet gears, the first set of planet gears being in meshing engagement with the first ring gear and the first sun gear,
a second planetary gear set comprising a second sun gear, a second ring gear and a second planet carrier carrying a second set of planet gears, the second set of planet gears being in meshing engagement with the second ring gear and the second sun gear,
a third planetary gear set comprising a third sun gear, a third ring gear and a third planet carrier carrying a third set of planet gears, the third set of planet gears being in meshing engagement with the third ring gear and the third sun gear,
an input shaft connectable to a prime mover, the input shaft being operatively connected to the second sun gear and to the third sun gear,
a first intermediate shaft operatively connected to the first ring gear and to the second planet carrier,
a gear selection arrangement, comprising
a first locking mechanism connected to the first planet carrier,
a second locking mechanism connected to the first sun gear, the second ring gear and the third planet carrier, and
a third locking mechanism connected to the third ring gear,
a first output shaft configured to be connected to a first driven axle,
a second output shaft configured to be connected to a second driven axle,
a differential unit connected to the first intermediate shaft, the differential unit being configured to distribute torque to the first and second output shafts, and
a first clutch configured to selectively rotationally connect the input shaft to the first intermediate shaft.

14. A transmission arrangement, comprising:
a first planetary gear set comprising a first sun gear, a first ring gear and a first planet carrier carrying a first set of planet gears, the first set of planet gears being in meshing engagement with the first ring gear and the first sun gear,
a second planetary gear set comprising a second sun gear, a second ring gear and a second planet carrier carrying a second set of planet gears, the second set of planet gears being in meshing engagement with the second ring gear and the second sun gear,
a third planetary gear set comprising a third sun gear, a third ring gear and a third planet carrier carrying a third set of planet gears, the third set of planet gears being in meshing engagement with the third ring gear and the third sun gear,
an input shaft connectable to a prime mover, the input shaft being operatively connected to the second sun gear and to the third sun gear,
a first intermediate shaft operatively connected to the first ring gear and to the second planet carrier,
a gear selection arrangement, comprising
a first locking mechanism connected to the first planet carrier,
a second locking mechanism connected to the first sun gear, the second ring gear and the third planet carrier, and
a third locking mechanism connected to the third ring gear,
a first output shaft configured to be connected to a first driven axle,
a second output shaft configured to be connected to a second driven axle,
a differential unit connected to the first intermediate shaft, the differential unit being configured to distribute torque to the first and second output shafts, and
an input shaft gearwheel arranged on the input shaft, the input shaft gearwheel being arranged in meshing engagement with a first gearwheel and a second gearwheel, wherein the first gearwheel is connectable to the prime mover, and the second gearwheel is connectable to a second prime mover.

\* \* \* \* \*